Oct. 19, 1926.

J. L. MYERS 1,603,488

METHOD OF MAKING GROOVED BUSHINGS

Filed May 9, 1923     3 Sheets-Sheet 1

INVENTOR.
James L. Myers
BY
Fay, Oberlin & Fay
ATTORNEYS.

Oct. 19, 1926.

J. L. MYERS

METHOD OF MAKING GROOVED BUSHINGS

Filed May 9, 1923          3 Sheets-Sheet 2

INVENTOR.
James L. Myers
BY
Fay, Oberlin & Fay
ATTORNEYS

Oct. 19, 1926.

J. L. MYERS 1,603,488

METHOD OF MAKING GROOVED BUSHINGS

Filed May 9, 1923　　　3 Sheets-Sheet 3

INVENTOR.
James L. Myers
BY
Fay, Oberlin & Fay
ATTORNEYS

Patented Oct. 19, 1926.

1,603,488

UNITED STATES PATENT OFFICE.

JAMES L. MYERS, OF CLEVELAND HEIGHTS, OHIO, ASSIGNOR TO THE CLEVELAND GRAPHITE BRONZE COMPANY, OF CLEVELAND, OHIO, A CORPORATION OF OHIO.

METHOD OF MAKING GROOVED BUSHINGS.

Application filed May 9, 1923. Serial No. 637,818.

The present invention relates to a method of making bearings, and more particularly to a method of forming lubricating grooves in rolled sheet metal bearings. One of the principal objects of the present invention is the provision of a lubricating groove in a sheet metal bearing which may be formed in a bearing during its usual course of manufacture. A second object of the invention is the provision of means for forming various types and shapes of grooves in such bearings and to a method of making the bearings, during the course of which such grooves may be formed as a part of the method, or at least without the necessity of additional operations. To the acomplishment of the foregoing and related ends, said invention, then, consists of the means hereinafter fully described and particularly pointed out in the claims.

The annexed drawings and the following description set forth in detail one method and one product exemplifying my invention, such disclosed procedure and product constituting, however, but one of various applications of the principle of my invention.

In said annexed drawings:—

Figure 1:
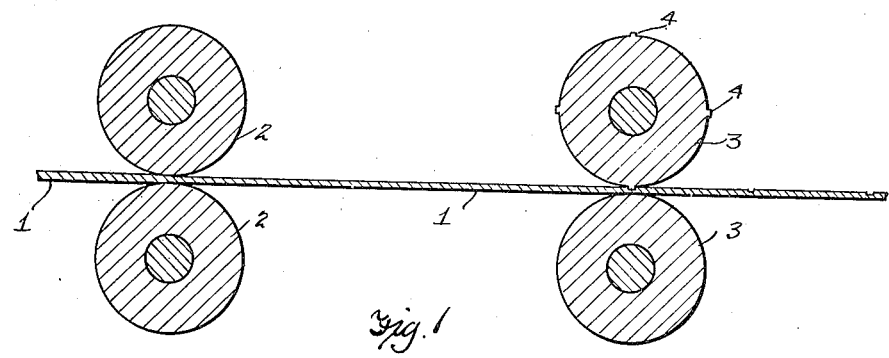
Figure 2:
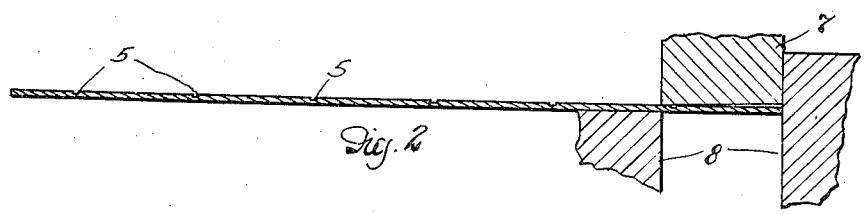
Figure 3:
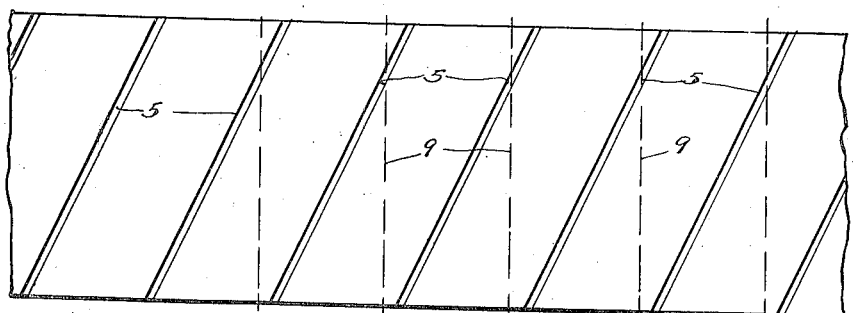
Figure 4:
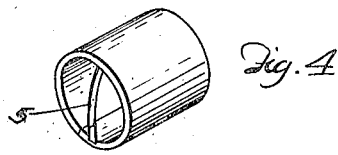
Figure 5:
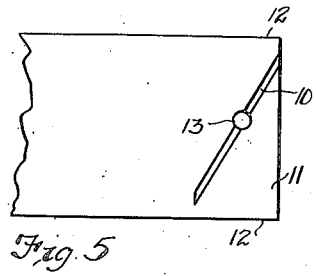
Figure 6:
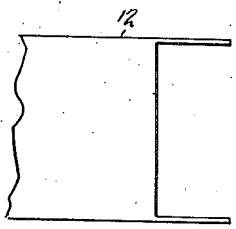
Figure 7:
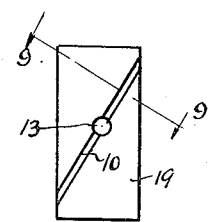
Figure 8:
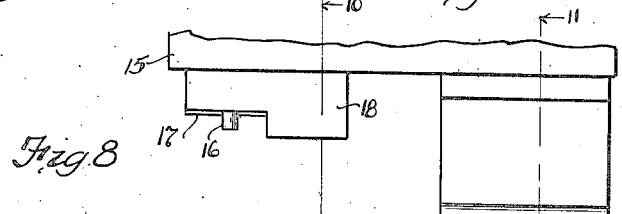
Figure 9:
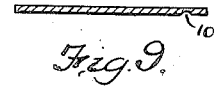
Figure 10:
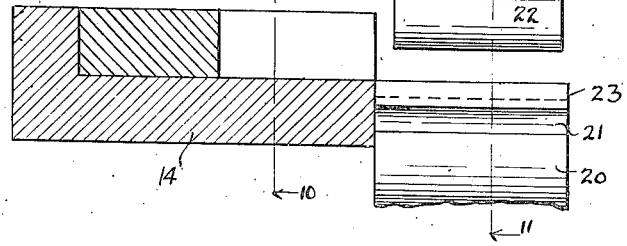
Figure 11:
Figure 11:
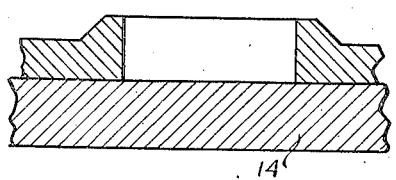
Figure 11:
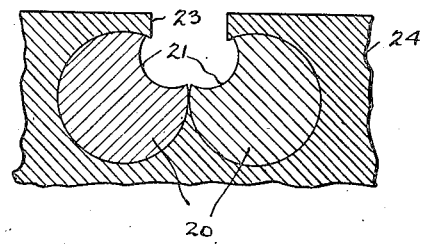
Figure 12:
Figure 13:
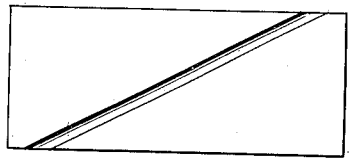

Fig. 1 shows a view in longitudinal section of apparatus for rolling a certain type of groove in a strip of metal designed to be formed in a bearing; Fig. 2 is a similar view showing the blanking means for severing the strip into sheets of the proper size for circling in bearings; Fig. 3 is a plan view of the strip after the formation of the grooves; Fig. 4 is a view in perspective of the finished bearing; Fig. 5 is a plan view showing the strip in which has been formed a groove slightly different from that shown in Fig. 3; Fig. 6 is a view of the strip after the blanking operation; Fig. 7 is a plan view of the blank cut from the strip; Fig. 8 is a longitudinal section through a combined grooving and blanking punch and the complementary dies and also the first forming punches or dies; Fig. 9 is a section on the line 9—9 in Fig. 7; Fig. 10 is a section on the line 10—10 of Fig. 8 through the blanking dies; Fig. 11 is a section on the line 11—11 Fig. 8 showing the first forming dies; Fig. 12 is a transverse section of the blank after the completion of the first forming operation; and Figs. 13 to 18, inclusive, are plan views of various blanks showing different types of lubricating grooves formed therein.

Referring now to Figs. 1, 2, 3 and 4 I have shown a strip 1 of rolled sheet metal possessing bearing qualities, such for example as brass or the like, which is first passed through sizing rolls 2, and then through grooving dies or rolls 3. One of the rolls 3 is provided with a series of projections 4 designed to produce diagonally extending grooves 5 in one surface of the strip 1. These grooves serve to convey oil or other lubricant from end to end of the finished bearing and to distribute the same over the shaft or pin which is journaled therein.

After the strip 1 is passed through the grooving rolls 3 it is passed into a blank punch consisting of a reciprocating die 7 and stationary dies 8, and blanks are in this way cut from the strip, the shape and size of the blank being indicated in Fig. 3 by the dotted lines 9. Certain types of grooves, such, for example, as those shown in Figs. 3 and 13, in which the groove extends from edge to edge of the original strip, may readily be formed by rolls, as indicated in Fig. 1, while other types of grooves shown in Figs. 14 to 18, inclusive, can more conveniently and economically be produced by means of reciprocating dies, which are shown in Figs. 8 to 11, inclusive.

In Fig. 5 there is shown a diagonally extending lubricant groove 10 in a strip 11, the groove terminating short of the sides or edges 12 of the strip 11, and having a lubricant carrying aperture 13 formed at some point, and passing entirely through the strip. Such an oil groove may be formed by means of the reciprocating dies shown in Figs. 8, 10 and 11. In Fig. 8 there is shown a stationary die 14 and a reciprocating die 15, the latter being provided with a cylindrical projection 16 adapted to form the oil hole 13 in the strip, and with a projection 17 extending from either side of the projection 16 and adapted to form the oil groove. This groove-forming die is combined with a blanking die 18, which is shown in transverse section in Fig. 10, and which cuts the blank 19, shown in Fig. 7, from the strip 12, leaving the latter in the condition indicated in Fig. 6. There is also combined with the grooving and blanking die, a forming device consisting of two complementary oscillatory cylinders 20, which are provided with circularly shaped recesses 21, and they are adapted to be oscillated by the downward movement of a cylindrical plunger 22. As the blank leaves the blanking die 18 and is fed forward into a slot 23 in the member 24, which carries the dies 20, the plunger 22 is brought down and bends or folds the blank into the shape shown in Fig. 12 against the complementary oscillating members 20, after which the partially formed bearing is discharged from this die and is then finished and formed into true cylindrical shape by any suitable means.

Figure 14:
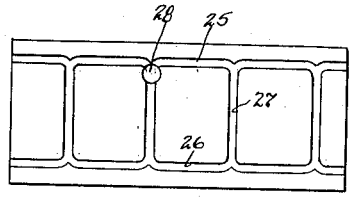
Figure 15:
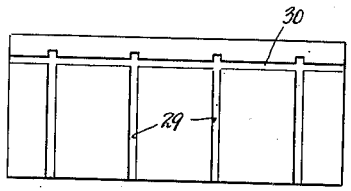
Figure 16:
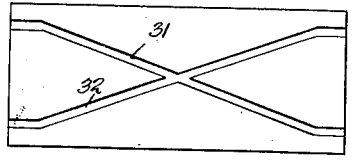
Figure 17:
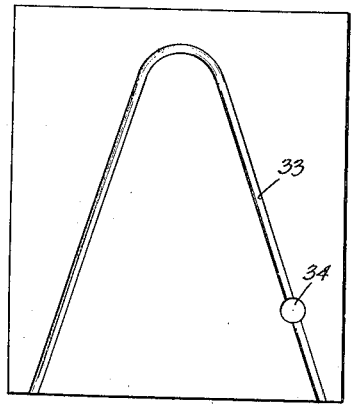
Figure 18:
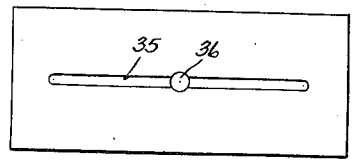

In Figs. 14 to 18, inclusive, I have shown various types of lubricating grooves, that of Fig. 14 consisting of two parallel grooves 25 and 26, connected by transverse grooves 27 with a supply opening through the bearing at the intersection of one of the transverse grooves and one of the two parallel grooves. In Fig. 15 a series of transverse grooves 29 are shown intersecting a longitudinal groove 30, and it should be remembered that the groove 30, shown as the longitudinal groove in the blank, becomes an encircling or circumferential groove in the finished bearing. In Fig. 16 I have shown two crossed grooves 31 and 32, which, in the finished bearing, will form a figure 8, while in Fig. 17 there is a single groove 33 and lubricant supply hole 34, the groove extending to the edges of the finished bearing on one side only. In Fig. 18 there is shown a circumferential groove 35 and supply opening 36, but the groove 35 does not extend completely around the interior of the finished bearing.

The advantages of the present bearings are their low cost of manufacture and the very much better distribution of lubricant which can be secured by reason of the shapes and forms of grooves which can be produced by the present method over those which are possible by machine or finished bushings, which is the method now in general use in producing lubricant grooves. The lubricant grooves produced by the present method add but very little to the cost of the bearing, and can be given practically any desired shape to insure proper distribution of the lubricant under various conditions.

Other forms may be employed embodying the features of my invention instead of one here explained, change being made in the form of construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a method of making bearings, the steps which consists in rolling a groove into a strip of sheet metal and simultaneously rolling the portions of the sheet metal adjacent to such groove to maintain the surface adjacent such groove in a flat and smooth condition, then bending the same into U-shape, and then completely circling such strip into a cylindrical bearing.

2. In a method of making bearings, the steps which consist in simultaneously forming a groove by pressure in a flat strip of rolled sheet metal, applying pressure to the portions of such strip adjacent to said groove to maintain the same in a flat, smooth condition, and forming an opening through said strip intersecting said groove.

3. In a method of making bearings, the steps which consist in forming by pressure a series of similar diagonally extending grooves in a strip of sheet metal, and successively blanking such strip into pieces crossed by two of such grooves and circling such pieces transversely of the original strip to bring the original portions of such two grooves into registration.

4. In a method of making bearings, the steps which consist in forming in a strip of metal a series of grooves extending transversely of the strip, and successively blanking such strip into pieces and circling such blanked pieces into a split cylindrical bearing member in a direction to bring the ends of such grooves into registration along the seam or split of said member.

5. In a method of making bearings, the steps which consist in forming in one surface of a strip of metal a series of grooves extending thereover to enclose a predetermined portion of the area thereof, applying pressure to the portions of such strip adjacent to said grooves to maintain the same in a flat and smooth condition, and then circling said strip into a split cylindrical bearing member while maintaining the same under a transverse pressure acting against the surface having said grooves.

6. In a method of making bushings, the steps which consist in forming a groove by pressure in a flat strip of rolled sheet metal, then cutting the strip into a blank the margin of which intercepts the groove.

Signed by me, this 7th day of May, 1923.

JAMES L. MYERS.